United States Patent
Suzuki et al.

(10) Patent No.: US 8,888,299 B2
(45) Date of Patent: Nov. 18, 2014

(54) LIGHT SOURCE DEVICE, METHOD OF DRIVING DISCHARGE LAMP, AND PROJECTOR

(75) Inventors: Junichi Suzuki, Chino (JP); Satoshi Kito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 13/572,162

(22) Filed: Aug. 10, 2012

(65) Prior Publication Data

US 2013/0050661 A1 Feb. 28, 2013

(30) Foreign Application Priority Data

Aug. 22, 2011 (JP) ................................. 2011-180328
Jun. 22, 2012 (JP) ................................. 2012-140545

(51) Int. Cl.
G03B 21/20 (2006.01)
H05B 41/36 (2006.01)
G03B 21/14 (2006.01)

(52) U.S. Cl.
CPC ............... *G03B 21/14* (2013.01); *H05B 41/36* (2013.01); *G03B 21/2053* (2013.01); *G03B 21/2026* (2013.01)
USPC .......................................................... 353/85

(58) Field of Classification Search
CPC .. G03B 21/2026; G03B 21/206; G03B 33/12; G03B 21/2053; G03B 21/2033; H05B 33/0866; H05B 33/0869; H05B 33/0872; H01J 65/046; H01J 11/18
USPC ............ 353/52, 85, 94, 98–99; 315/170–173, 315/205, 208, 219, 224, 239, 240, 241 R, 315/242, 244, 277, 291; 313/15, 146, 493, 313/634, 623
See application file for complete search history.

(56) References Cited

U.S. PATENT DOCUMENTS

| | | | | |
|---|---|---|---|---|
| 5,444,335 | A * | 8/1995 | Matsumoto et al. | 315/246 |
| 6,043,614 | A * | 3/2000 | Tessnow et al. | 315/291 |
| 6,927,539 | B2 | 8/2005 | Arimoto et al. | |
| 7,906,918 | B2 * | 3/2011 | Bleukx et al. | 315/291 |
| 2003/0076041 | A1 * | 4/2003 | Honda et al. | 313/634 |
| 2006/0066261 | A1 * | 3/2006 | Rahmane et al. | 315/291 |
| 2008/0024853 | A1 * | 1/2008 | Tanaka et al. | 359/238 |
| 2008/0048583 | A1 * | 2/2008 | Yamauchi et al. | 315/291 |
| 2010/0084987 | A1 | 4/2010 | Yamauchi et al. | |
| 2010/0157257 | A1 | 6/2010 | Nishizawa et al. | |

FOREIGN PATENT DOCUMENTS

| | | |
|---|---|---|
| JP | 2004-172086 | 6/2004 |
| JP | 2007-115534 | 5/2007 |
| JP | 2010-114064 | 5/2010 |
| WO | WO 2009/041367 A1 | 4/2009 |

* cited by examiner

*Primary Examiner* — Sultan Chowdhury
(74) *Attorney, Agent, or Firm* — Oliff PLC (57) ABSTRACT

A light source device includes a discharge lamp that has a first electrode and a second electrode opposed to each other in a hollow portion in which a discharge medium is enclosed and a driving device that supplies a driving voltage to the first electrode and the second electrode. The driving voltage is applied to the discharge medium through the first electrode and the second electrode such that the discharge medium emits light.

6 Claims, 6 Drawing Sheets

LIGHT SOURCE DEVICE, METHOD OF DRIVING DISCHARGE LAMP, AND PROJECTOR

BACKGROUND

1. Technical Field

The present invention relates to a light source device, a method of driving a discharge lamp, and a projector.

2. Related Art

As a light source of a projector, a discharge lamp such as a high pressure mercury lamp and a metal halide lamp is used.

In the discharge lamp, an alternating current as a driving current is supplied between a pair of electrodes to cause arc discharge such that a discharge medium enclosed in the discharge lamp emits light. When the discharge lamp is turned on, the electrodes are at a high temperature by the arc discharge generated between the pair of electrodes, the electrodes are melted, and a space between the electrodes is broadened.

In the use of a projector, in order to improve efficiency in light usage, it is preferable to keep a narrow state between the electrodes to lower the intensity of light emission. It is not preferable that the electrodes are separated from each other during ignition, whereby the efficiency of light usage is decreased. The change between the electrodes means a change in impedance between the electrodes. For this reason, even when the discharge lamp is efficiently turned on at the initial time of ignition, impedance mismatching occurs after the time has elapsed. As a result, there is a problem that reactive power is increased, and the efficiency is decreased.

For example, in a driving method disclosed in JP-A-2004-172086, a voltage between a pair of electrodes of a discharge lamp is detected, a frequency of an alternating current is lowered when the inter-electrode voltage is lower than the lower limit value, protrusions formed at front end portions of a pair of electrodes are melted, an inter-electrode distance is increased, and thus an inter-electrode voltage is lowered.

When the inter-electrode voltage is higher than an upper limit value, the frequency of the alternating current is raised, the protrusions formed at the front end portion of a pair of electrodes are grown, the inter-electrode distance is decreased, and the inter-electrode voltage is lowered.

However, in the driving method disclosed in JP-A-2004-172086, the frequency of the alternating current is 400 Hz even in the maximum, blackening or devitrification of the discharge lamp body occurs, and durability of the discharge lamp may be decreased.

In order to grow the protrusions formed at the front end portions of a pair of electrodes, it is preferable to set the frequency of the alternating current to be equal to or lower than 1 kHz. However, when such a low frequency alternating current is supplied to a pair of electrodes, the discharge lamp body is more easily blackened.

SUMMARY

An advantage of some aspects of the invention is to provide a light source device which suppresses the blackening of a discharge lamp and broadening of an inter-electrode distance to drive the discharge lamp, a method of driving the discharge lamp, and a projector.

According to an aspect of the invention, there is provided a light source device including: a discharge lamp that has a first electrode and a second electrode opposed to each other in a hollow portion in which a discharge medium is enclosed; and a driving device that supplies a driving voltage to the first electrode and the second electrode, wherein the driving voltage is applied to the discharge medium through the first electrode and the second electrode such that the discharge medium emits light, wherein in a first period when an inter-electrode voltage between the first electrode and the second electrode is changed from a first value to a second value larger than the first value, the driving device relatively changes the potential of the first electrode with respect to potential of the second electrode at a first frequency, wherein in a second period when the inter-electrode voltage between the first electrode and the second electrode is changed from the second value to a third value smaller than the second value, the driving device relatively changes potential of the first electrode with respect to potential of the second electrode at a second frequency, wherein the first frequency is higher than 1 kHz, and wherein the second frequency is equal to or lower than 1 kHz.

According to the aspect of the invention, in the period when the inter-electrode voltage between the first electrode and the second electrode of the discharge lamp is raised from the first value to the second value, the driving voltage is applied between the electrodes at the first frequency higher than 1 kHz, and the alternating current flows. That is, in the first period, the frequency of the alternating current voltage (the alternating current) is raised compared with the second period, and thus it is possible to suppress blackening of the discharge lamp. It is possible to recover the blackening of the blackened discharge lamp before the first period. However, in the first period, the protrusions formed at the front end portions of a pair of electrodes are consumed before the first period, and thus the inter-electrode distance is broadened. In other words, when the driving device supplies a constant power between a pair of electrodes, the inter-electrode voltage is raised by broadening of the inter-electrode distance in the first period. When the driving frequency of the discharge lamp is raised according to the increase of the inter-electrode voltage, it is possible to further suppress the blackening of the discharge lamp.

Meanwhile, in the second period when the inter-electrode voltage between the first electrode and the second electrode is lowered from the second value to the third value, the driving voltage is applied between the electrodes at the second frequency equal to or lower than 1 kHz, and the alternating current flows. In the second period, the fluctuation of the electrode temperature is larger than that of the first period, a part of the electrodes melted by the discharge is solidified again, protrusions are formed at the front end portions of a pair of electrodes, and the protrusions grow. Accordingly, it is possible to narrow the inter-electrode distance broadened in the first period. However, in the second period, the discharge lamp may be blackened.

Accordingly, for example, the first period and the second period are combined to suppress the blackening of the discharge lamp, the broadening of the inter-electrode distance is suppressed, and it is possible to drive the discharge lamp. Therefore, it is possible to provide the light source device in which durability of the discharge lamp is high.

In the light source device, in the first period, the driving device may decrease a first alternating current flowing between the first electrode and the second electrode.

Accordingly, it is possible to supply the constant power from the driving device between a pair of electrodes, and thus it is possible to suppress the change of the light quantity in the first period.

In the light source device, in the second period, the driving device may increase a second alternating current flowing between the first electrode and the second electrode.

Accordingly, it is possible to supply the constant power from the driving device between a pair of electrodes, and thus it is possible to suppress the change of the light quantity in the second period.

In the light source device, the driving device may alternately repeat the first period and the second period.

Accordingly, it is possible to more reliably suppress the broadening of the inter-electrode distance while suppressing the blackening of the discharge lamp.

According to another aspect of the invention, there is provided a method of driving a discharge lamp which has a first electrode and a second electrode opposed to each other in a hollow portion in which a discharge medium is enclosed, wherein a driving voltage is applied to the discharge medium through the first electrode and the second electrode such that the discharge medium emits light, wherein in a first period when an inter-electrode voltage between the first electrode and the second electrode is changed from a first value to a second value larger than the first value, potential of the first electrode is relatively changed with respect to potential of the second electrode at a first frequency, wherein in a second period when the inter-electrode voltage between the first electrode and the second electrode is changed from the second value to a third value smaller than the second value, potential of the first electrode is relatively changed with respect to potential of the second electrode at a second frequency, wherein the first frequency is higher than 1 kHz, and wherein the second frequency is equal to or lower than 1 kHz.

Accordingly, the blackening of the discharge lamp is suppressed, the broadening of the inter-electrode distance is suppressed, and it is possible to drive the discharge lamp. That is, it is possible to provide the method of driving a discharge lamp to obtain long light emission durability.

According to still another aspect of the invention, there is provided a projector including: a light source device; a modulation device that modulates light output from the light source device on the basis of image information; and a projection device that projects the light modulated by the modulation device, wherein the light source device includes a discharge lamp that has a first electrode and a second electrode opposed to each other in a hollow portion in which a discharge medium is enclosed, and a driving device that supplies a driving voltage to the first electrode and the second electrode, wherein the driving voltage is applied to the discharge medium through the first electrode and the second electrode such that the discharge medium emits light, wherein in a first period when an inter-electrode voltage between the first electrode and the second electrode is changed from a first value to a second value larger than the first value, the driving device relatively changes potential of the first electrode with respect to potential of the second electrode at a first frequency, wherein in a second period when the inter-electrode voltage between the first electrode and the second electrode is changed from the second value to a third value smaller than the second value, the driving device relatively change potential of the first electrode with respect to potential of the second electrode at a second frequency, wherein the first frequency is higher than 1 kHz, and wherein the second frequency is equal to or lower than 1 kHz.

Accordingly, the blackening of the discharge lamp is suppressed, the inter-electrode distance is suppressed from broadening, and it is possible to drive the discharge lamp. Therefore, it is possible to reduce power consumption, and it is possible to provide a projector capable of displaying a stable and satisfactory image.

DESCRIPTION OF EXEMPLARY EMBODIMENTS

Hereinafter, a light source device, a method of driving a discharge lamp, and a projector will be described in detail on the basis of preferred embodiments shown in the accompanying drawings.

Light Source Device

Figure 1:
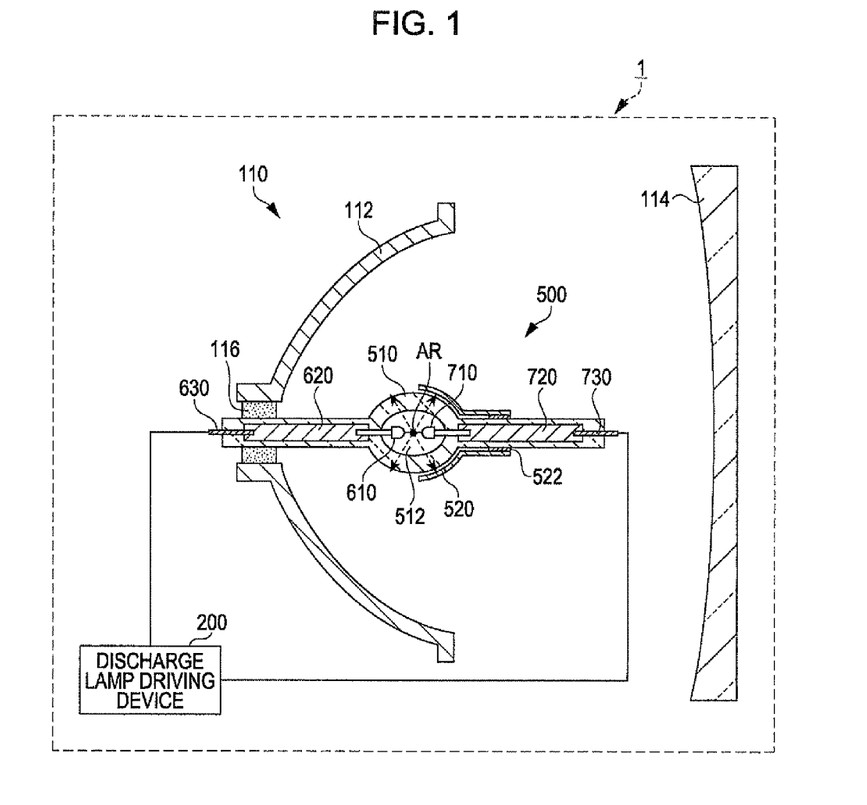
FIG. 1 is a cross-sectional view (also including a block diagram) illustrating a light source device according to an embodiment of the invention.
Figure 2:
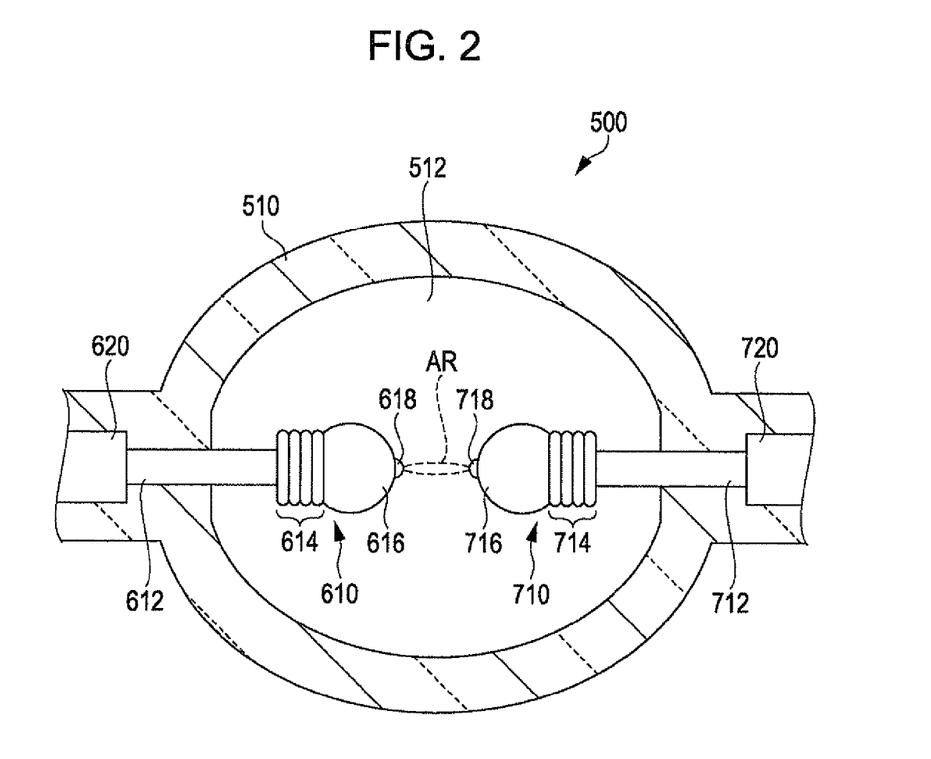
FIG. 2 is a cross-sectional view illustrating a discharge lamp of the light source device shown in FIG. 1.
Figure 3:
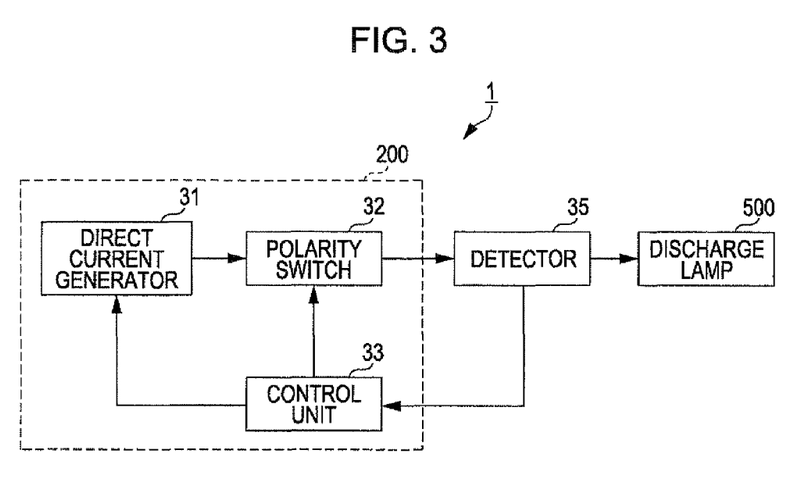
FIG. 3 is a block diagram illustrating the light source device shown in FIG. 1.
Figure 4:
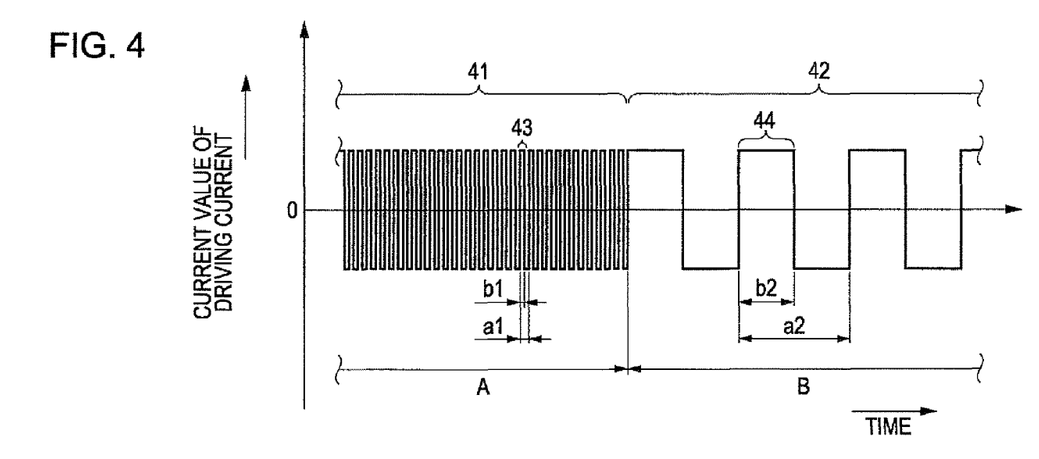
FIG. 4 is a diagram illustrating a driving current of the light source device shown in FIG. 1.
Figure 5:
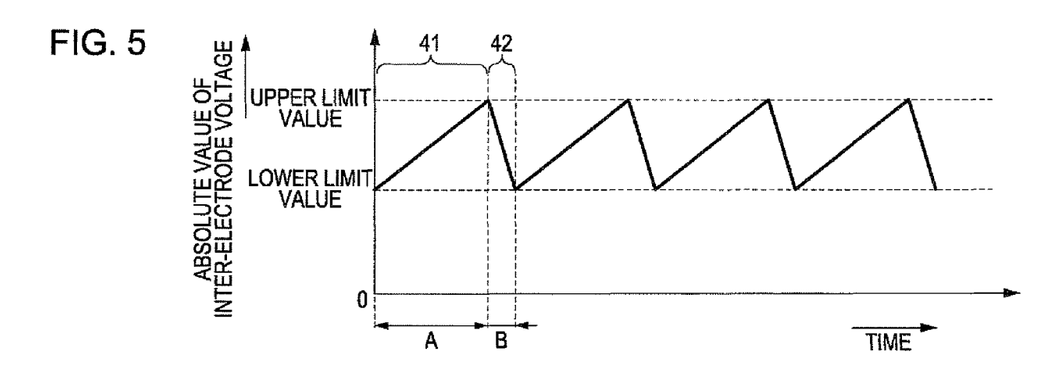
FIG. 5 is a diagram illustrating an absolute value of an inter-electrode voltage of the light source device shown in FIG. 1.
Figure 6:
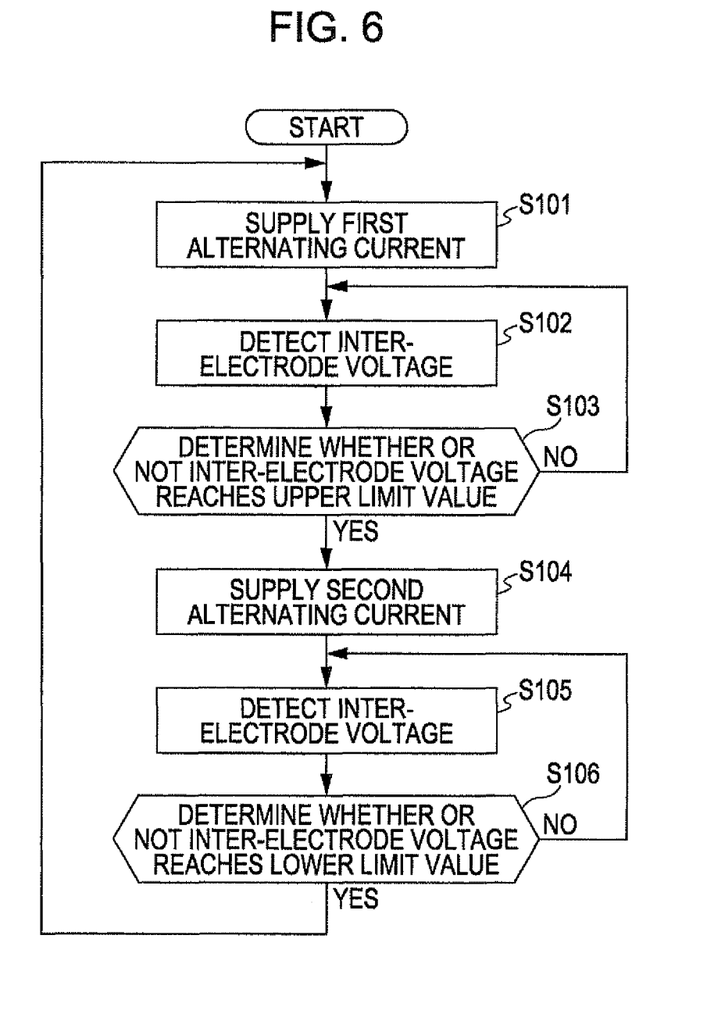
FIG. 6 is a flowchart illustrating a control operation of the light source device shown in FIG. 1.

FIG. 1 is a cross-sectional view (also including a block diagram) illustrating a light source device according to an embodiment of the invention, FIG. 2 is a cross-sectional view illustrating a discharge lamp of the light source device shown in FIG. 1, FIG. 3 is a block diagram illustrating the light source device shown in FIG. 1, FIG. 4 is a diagram illustrating a driving current of the light source device shown in FIG. 1, FIG. 5 is a diagram illustrating an absolute value of an inter-electrode voltage of the light source device shown in FIG. 1, and FIG. 6 is a flowchart illustrating a control operation of the light source device shown in FIG. 1. In FIG. 2, a sub-reflector is not shown.

As shown in FIG. 1, the light source device 1 of the embodiment includes a light source unit 110 having a discharge lamp 500, a discharge lamp driving device (a driving device) 200 that drives the discharge lamp 500, and a detector (a voltage detecting unit) 35. Power is supplied from the discharge lamp driving device 200 to the discharge lamp 500, and the discharge lamp 500 is discharged and emits light.

The light source unit 110 includes the discharge lamp 500, a main reflector 112 that has a concave reflective face, and a collimation lens 114 that collimates the output light to collimated light. The main reflector 112 and the discharge lamp 500 are adhered by an inorganic adhesive 116. In the main reflector 112, a face (an inner face) facing the discharge lamp 500 is a reflection face, and the reflection face has a rotation elliptical face in the shown configuration.

The shape of the reflection face of the main reflector 112 is not limited to the shape described above, and for example, may be a rotation parabolic face. When the reflection face of the main reflector 112 is the rotation parabolic face and when the light emitting unit of the discharge lamp 500 is disposed at a so-called focus of the rotation parabolic face, the collimation lens 114 may be omitted.

The discharge lamp 500 is provided with a discharge lamp body 510 and a sub-reflector 520 that has a concave reflection face. The discharge lamp body 510 and the sub-reflector 520 are adhered by an inorganic adhesive 522 such that the sub-reflector 520 and the main reflector 112 are opposed to each other and the concave reflection face is disposed with a predetermined gap from the discharge lamp body 510. In the sub-reflector 520, a face (an inner face) facing the discharge lamp 500 is a reflection face, and the reflection face is a spherical face in the shown configuration.

The discharge lamp body 510, in which a discharge medium to be described later is enclosed at the center thereof, has an air-tightly sealed discharge space (a hollow portion) 512, and a light emission container including the discharge space (the hollow portion) 512 are formed. A portion corresponding to at least the discharge space 512 of the discharge lamp body 510 has optical transparency. A material constituting the discharge lamp body 510 may be, for example, glass such as quartz glass, and optical transparent ceramics.

The discharge lamp body 510 is provided with a pair of electrodes 610 and 710, a pair of conductive connection members 620 and 720, and a pair of electrode terminals 630 and 730. The electrode (the first electrode) 610 and the electrode terminal 630 are electrically connected by the connection member 620. Similarly, the electrode (the second electrode) 710 and the electrode terminal 730 are electrically connected by the connection member 720.

Each of the electrodes 610 and 710 is housed in the discharge space 512. That is, the electrodes 610 and 710 are disposed such that the front end portions thereof are spaced each other at a predetermined distance and opposed to each other in the discharge space 512 of the discharge lamp body 510.

Considering the use as a light source of a projector to be described later, an inter-electrode distance that is the shortest distance between the electrode 610 and the electrode 710 is preferably such that light emissions close to a point light source can be obtained, preferably equal to or more than 1 μm and equal to or less than 5 mm, and more preferably equal to or more than 0.5 mm and equal to or less than 1.5 mm.

As shown in FIG. 2, the electrode 610 includes a core rod 612, a coil portion 614, and a body portion 616. In the step before being enclosed into the discharge lamp body 510, the electrode 610 is formed by winding an electrode material (tungsten or the like) on the core rod 612 to form the coil portion 614 and by heating and melting the formed coil portion 614. Accordingly, on the front end side of the electrode 610, the body portion 616 with high thermal capacity is formed. Similarly to the electrode 610, the electrode 710 includes a core rod 712, a coil portion 714, and a body portion 716, and is formed in the same manner as the electrode 610.

In a state where the discharge lamp 500 is not turned on even once, the body portions 616 and 716 are not provided with protrusions 618 and 718. However, when the discharge lamp 500 is turned on once in a condition to be described later, the protrusions 618 and 718 are formed at the front end portions of the body portions 616 and 716, respectively. The protrusions 618 and 718 are kept during turning-on of the discharge lamp 500, and are even kept after turning-off.

The constituent material of the electrodes 610 and 710 may be, for example, a high melting point metal material such as tungsten.

In the discharge space 512, the discharge medium is enclosed. The discharge medium includes, for example, discharge starting gas, or gas contributing to emit light. The discharge medium may include the other gas.

The discharge starting gas may be, for example, a noble gas such as neon, argon, or xenon. The gas contributing to the emitted light may be, for example, mercury and the vaporization material of a metal halide. The other gas may be, for example, gas having a function of preventing blackening. The gas having the function of preventing the blackening may be, for example, a halogen (for example, bromine), a halogen compound (for example, hydrogen bromide), or a vaporization material thereof.

Considering that the discharge is rapidly started and it is possible to obtain a stable discharge state, atmospheric pressure in the discharge lamp body 510 at the time of turning on the discharge lamp 510 is preferably equal to or higher than 0.1 atm and equal to or lower than 300 atm, and more preferably equal to or higher than 50 atm and equal to or lower than 300 atm.

Each of the electrodes terminal 630 and 730 of the discharge lamp 500 is connected to the output terminal of the driving device 200. The discharge lamp driving device 200 supplies a driving current (a driving power) including an alternating current (an alternating power) of a plurality of frequencies to the discharge lamp 500. Specifically, the discharge lamp driving device 200 applies a predetermined driving voltage to the electrodes 610 and 710 through the electrode terminals 630 and 730. The predetermined driving voltage is applied such that the polarities of the electrode 610 and the electrode 710 are alternately changed to anode and cathode. Accordingly, the driving current flows between the electrodes 610 and 710 and the power is supplied to the discharge lamp 500. When the driving current is supplied to the electrodes 610 and 710, arc discharge (arc AR) occurs between the front end portions of a pair of electrodes 610 and 710 in the discharge space 512, and the discharge medium emits light. The light (the discharge light) generated by the arc discharge is emitted in all directions from the occurrence position (the discharge position) of the arc AR. The sub-reflector 520 reflects the light emitted in the direction of one electrode 710 toward the main reflector 112. As described above, the light emitted in the direction of the electrode 710 is reflected by the main reflector 112, and thus it is possible to effectively use the light emitted in the direction of the electrode 710. In the embodiment, the discharge lamp 500 is provided with the sub-reflector 520, but the discharge lamp 500 does not have to be provided with the sub-reflector 520.

Next, the discharge lamp driving device 200 and a detector 35 will be described with reference to FIG. 3.

As shown in FIG. 3, the discharge lamp driving device 200 includes a direct current generator 31 that generates a direct current, a polarity switcher 32 that switches the positive and negative polarities of the direct current output from the direct current generator 31, and a control unit 33, switches the polarity of the direct current from the polarity switcher 32 to generate an alternating current (a direct alternating current) of a predetermined frequency, and supplies the alternating current as the driving current to a pair of electrodes 610 and 710 of the discharge lamp 500. A first alternating current supply unit and a second alternating current supply unit are configured by the direct current generator 31, the polarity switcher 32, and the control unit 33.

The control unit 33 controls the whole operation of the direct current generator 31, the polarity switcher 32, and the discharge lamp driving device 200. The direct current generator 31 adjusts the output current value, and the current value of the direct current generator 31 is adjusted by the control of the control unit 33. The timing for the switching of the polarity of the direct current in the polarity switcher 32 is adjusted by the control of the control unit 33.

The detection result of the detector (the inter-electrode distance detecting unit) 35 separately provided on the output side (between the discharge lamp 500 and the discharge lamp driving device 200) of the discharge lamp driving device 200 is input to the control unit 33. In the embodiment, the detector 35 is provided separately from the discharge lamp driving device 200, but may be integrated in the discharge driving device 200. An amplifier (not shown) may be provided, for example, at the rear end of the polarity switcher 32, that is, between the polarity switcher 32 and the detector 35.

In the embodiment, the discharge lamp driving device 200 generates the direct current by the direct current generator 31, but the direction current generator 31 may be replaced by a direct current voltage generator, and the polarity switcher 32 may switch positive and negative polarities with respect to the reference potential of the direction voltage. Accordingly, the control unit 33 switches the polarity of the direct current voltage by the polarity switcher 32 to generate an alternating current voltage of a predetermined frequency. The discharge lamp driving device 100 applies the alternating current voltage as the driving voltage to a pair of electrodes 610 and 710 of the discharge lamp 500. Accordingly, the alternating current flows and the power is supplied between a pair of electrodes 610 and 710. In other words, the alternating current voltage represents that the relative potential of the electrode 610 with respect to the electrode 710 is periodically switched to be positive and negative with respect to the reference potential. In the embodiment, the reference potential is, for example, 0 V. When the electrode potential is positive with respect to the reference potential, the electrode serves as an anode, and when the electrode potential is negative with respect to the reference potential, the electrode serves as a cathode.

As shown in FIG. 4 and FIG. 5, in the discharge lamp driving device 200, the polarity of the direct current generated by the direct current generator 31 is switched by the polarity switcher 32 such that the first alternating current supply section 41, generating the first alternating current (the high frequency alternating current) and supplying the first alternating current to a pair of electrodes 610 and 710, and the second alternating current supply section 42, generating the second alternating current (a low frequency alternating current) with a frequency lower than that of the first alternating current and supplying the alternating current to a pair of electrodes 610 and 710, are alternately repeated. That is, the alternating current that is the driving current for driving the discharge lamp, which is formed by alternating repetition between the first alternating current supply section 41 and the second alternating current supply section 42 are alternately repeated, is generated and output. The driving current output from the discharge lamp driving device 200 is supplied to a pair of the electrodes 610 and 710 of the discharge lamp 500.

Accordingly, as described above, arc discharge occurs between the front end portions of a pair of electrodes 610 and 710, and the discharge lamp 500 is turned on.

As described above, the first alternating current (the high frequency alternating current) may be replaced by the first alternating current voltage (the high frequency alternating current voltage). Similarly, the second alternating current (the low frequency alternating current) may be replaced by the second alternating current voltage (the low frequency alternating current voltage). Accordingly, the first alternating current supply section 41 may be replaced by the first period of applying the alternating current voltage to the electrodes 610 and 710 at the first frequency that is the high frequency, and the second alternating current supply section 42 may be replaced by the second period of applying the alternating current voltage to the electrodes 610 and 710 at the second frequency that is the low frequency.

In the light source device 1, the discharge lamp 500 is turned on using the driving current (the driving voltage) in a condition to be described later. Accordingly, when the discharge lamp 500 is turned on, the temperatures of the electrodes 610 and 710 are changed, the protrusions 618 and 718 are formed at the front end portions of the electrodes 610 and 710 by the temperature change, respectively, and it is possible to keep the protrusions 618 and 718. It is possible to suppress the blackening of the discharge lamp 500, and it is possible to achieve long durability.

That is, in the second alternating current supply section (the second period) 42, the second alternating current, to be described later, is supplied to the electrodes 610 and 710, the protrusions 618 and 718 are formed at the front end portions of the electrodes 610 and 710, the protrusions 618 and 718 grow, and thus the inter-electrode distance between a pair of electrodes 610 and 710 separated in the first alternating current supply section (the first period) 41 may be narrowed (decreased).

Specifically, in the second alternating current supply section (the second period) 42, first, in the section (the section 44 shown by the period b2 of FIG. 4) in which the polarity of the second alternating current (the second alternating current voltage) is positive, the temperatures of the electrodes 610 and 710 are raised, a part of the front end portions of the electrodes 610 and 710 is melted, the melted electrode material gathers at the front end portions of the electrodes 610 and 710 by surface tension. Meanwhile, in the section (the section except for the period b1 in the period a1 shown in FIG. 4) in which the polarity of the second alternating current (the second alternating current voltage) is negative, the temperatures of the electrodes 610 and 710 are lowered, and thus the melted electrode material is solidified. The state where the melted electrode material gathers at the front end portions of the electrodes 610 and 710 and the state where the melted electrode material is solidified are repeated, and thus the growth of the protrusions 618 and 718 occurs.

As will be described later, the first alternating current supply section (the first period) 41 and the second alternating current supply section (the second period) 42 are switched to regulate the inter-electrode distance to within a predetermined range to suppress the inter-electrode distance from broadening, and it is possible to keep the state where the inter-electrode distance is narrow. Accordingly, it is possible to efficiently drive the discharge lamp 500.

However, in the second alternating current supply section (the second period) 42, a part of the front end portions of the electrodes 610 and 710 is melted, the melted electrode material is evaporated and reacts with the discharge lamp body 510 or the discharge medium, and the discharge lamp 500 may be blackened.

Meanwhile, in the first alternating current supply section (the first period) 41, the first alternating current, (the first alternating current voltage) to be described later, is supplied (applied) to the electrodes 610 and 710, the blackening of the discharge lamp 500 is suppressed, and it is possible to recover the blackening of the blackened discharge lamp 500 in the second alternating current supply section (the second period) 42.

However, in the first alternating current supply section (the first period) 41, the protrusions 618 and 718 formed at the front end portions of the electrodes 610 and 710 in the second alternating current supply section (the second period) 42 becomes small, and thus the inter-electrode distance may be broadened.

As described above, the first alternating current supply section (the first period) 41 and the second alternating current supply section (the second period) 42 are alternately repeated, the blackening of the discharge lamp 500 is suppressed, the inter-electrode distance is suppressed broadening, and it is possible to drive the discharge lamp 500.

The rated power of the discharge lamp 500 is appropriately set according to the usage or the like, and is not particularly limited, but is preferably equal to or higher than 10 W and equal to or lower than 5 kW, and more preferably equal to or higher than 100 W and equal to or lower than 500 W.

The frequency (the first frequency) of the first alternating current (the first alternating current voltage) is preferably higher than 1 kHz, more preferably higher than 1 kHz and equal to or lower than 10 GHz, even more preferably higher than 1 kHz and equal to or lower than 100 kHz or equal to or higher than 3 MHz and equal to or lower than 10 GHz, even more preferably equal to or higher than 3 kHz and equal to or lower than 100 kHz or equal to or higher than 3 MHz and equal to or lower than 3 GHz, and most preferably equal to or higher than 10 kHz and equal to or lower than 100 kHz or equal to or higher than 3 MHz and equal to or lower than 3 GHz. In addition, the frequency of the first alternating current is preferably equal to or higher than 3 kHz and equal to or lower than 100 kHz, and more preferably equal to or higher than 10 kHz and equal to or lower than 100 kHz.

When the electrodes 610 and 710 operate as anodes, the electrode temperature is high compared with the case of operating as cathodes. However, by setting the first frequency of the first alternating current (the first alternating current voltage) to be higher than 1 kHz, it is possible to prevent the electrode temperature from being changed in one cycle of the first alternating current (the first alternating current voltage), the blackening of the discharge lamp 500 is suppressed, and it is possible to recover the blackening of the blackened discharge lamp 500 in the second alternating current supply section (the second period) 42.

However, when the first frequency of the first alternating current (the first alternating current voltage) is equal to or lower than 1 kHz, the temperatures of the electrodes 610 and 710 are changed every cycle of the first alternating current (the first alternating current voltage) according to the other condition, and the discharge lamp 500 is blackened.

When the first frequency of the first alternating current (the first alternating current voltage) is higher than 10 GHz, the cost is high.

When the first frequency of the first alternating current (the first alternating current voltage) is higher than 100 kHz and lower than 3 MHz, the discharge is unstable due to an acoustic resonance effect.

The second frequency of the second alternating current (the second alternating current voltage) is preferably equal to or lower than 1 kHz, more preferably equal to or lower than 500 Hz, even more preferably equal to or higher than 10 Hz and equal to or lower than 500 Hz, and particularly preferably equal to or higher than 30 Hz and equal to or lower than 300 Hz.

When the second frequency of the second alternating current (the second alternating current voltage) is over the upper limit, the protrusions 618 and 718 are not formed according to the other condition. When the second frequency of the second alternating current (the second alternating current voltage) is below the lower limit, the protrusions 618 and 718 are melted and collapsed according to the other condition, and the blackening more easily occurs.

In the first alternating current supply section (the first section) 41, the first frequency of the first alternating current (the first alternating current voltage) is constant, and in the second alternating current supply section (the second section) 42, the second frequency of the second alternating current (the second alternating current voltage) is constant. The invention is not limited thereto, and in the first alternating current supply section (the first period) 41, the first frequency of the first alternating current (the first alternating current voltage) may be modified. That is, the first frequency of the first alternating current (the first alternating current voltage) may be changed with the passage of time.

Accordingly, it is possible to more precisely perform a control. In the second alternating current supply section (the second period) 42, the second frequency of the second alternating current (the second alternating current voltage) may be modified. That is, the second frequency of the second alternating current (the second alternating current voltage) may be changed with the passage of time. Accordingly, it is possible to more precisely perform a control.

It is preferable that the length of the first alternating current supply section (the first period) 41 be longer than the second alternating current supply section (the second period) 42. In this case, when the first alternating current supply section (the first period) 41 is A, and the second alternating current supply section (the second period) 42 is B, it is preferable that A/B is set to be larger than 1. The A/B is preferably set to be more than 1 and equal to or less than 50, more preferably set to be equal to or more than 2 and equal to or less than 50, and even more preferably set to be equal to or more than 2 and equal to or less than 5.

Accordingly, it is possible to suppress the blackening of the discharge lamp 500 and to suppress the inter-electrode distance from spreading.

The length B of the second alternating current supply section (the second period) 42 may be longer than the length A of the first alternating current supply section (the first period) 41, and the length A of the first alternating current supply section (the first period) 41 may be the same as the length B of the second alternating current supply section (the second period) 42.

The length A is preferably equal to or more than 10 minutes and equal to or less than 3 hours, and more preferably equal to or more than 10 minutes and equal to or less than 1 hour. Accordingly, it is possible to more reliably suppress the blackening of the discharge lamp 500, and it is possible to restore the blackening of the discharge lamp 500 blackened in the second alternating current supply section (the second period) 42.

The length B is preferably equal to or more than 1 minute and equal to or less than 60 minutes, and more preferably equal to or more than 1 minute and equal to or less than 10 minutes. Accordingly, it is possible to suppress the inter-electrode distance from broadening more reliably.

In the first alternating current supply section (the first period) 41, the first alternating current (the first alternating current voltage) is decreased. That is, in the first alternating current supply section (the first period) 41, the protrusions 618 and 718 become small, the inter-electrode distance is increased, the inter-electrode voltage (the absolute value of the inter-electrode voltage) is increased, and thus the first alternating current (the first alternating current voltage) is decreased such that the power supplied to the discharge lamp 500 is constant. Accordingly, it is possible to keep the light quantity constant.

On the contrary, in the second alternating current supply section (the second period) 42, the amplitude of the second alternating current (the second alternating current voltage) is increased. That is, in the second alternating current supply section (the second period) 42, the protrusions 618 and 718 become large, the inter-electrode distance is decreased, the inter-electrode voltage (the absolute value of the inter-electrode voltage) is decreased, and thus the second alternating current (the second alternating current voltage) is increased such that the power supplied to the discharge lamp 500 is constant. Accordingly, it is possible to keep the light quantity constant.

Waveforms of the first alternating current (the first alternating current voltage) and the second alternating current (the second alternating current voltage) are respectively rectangular shapes (rectangular waves). Accordingly, it is possible to suppress the blackening of the discharge lamp 500 more reliably.

The waveforms of the first alternating current (the first alternating current voltage) and the second alternating current (the second alternating current voltage) are not limited to the rectangular shape, and may be, for example, wavelike.

When the cycle of the first alternating current (the first alternating current voltage) is a1 and the period of the section 43 is b1, a ratio b1/a1 (a duty ratio) of the cycle a1 and the period b1 is preferably equal to or higher than 10% and equal to or lower than 90%, and more preferably equal to or higher than 20% and equal to or lower than 80%, and even more preferably 50%.

When the cycle of the second alternating current (the second alternating current voltage) is a2 and the period of the section 44 is b2, a ratio b1/a2 (a duty ratio) of the cycle a2 and the period b2 is preferably equal to or higher than 10% and equal to or lower than 90%, and more preferably equal to or higher than 20% and equal to or lower than 80%, and even more preferably 50%. Accordingly, it is possible to form the protrusions 618 and 718 symmetrically with each other on the electrodes 610 and 710.

When the light quantity in the first alternating current supply section (the first period) 41 is the same as the light quantity in the second alternating current supply section (the second period) 42, the average value of the magnitude of the first alternating current (the first alternating current voltage) in the first alternating current supply section (the first period) 41 and the average value of the intensity of the second alternating current (the second alternating current voltage) in the second alternating current supply section (the second period) 42.

The magnitude of the alternating current (the alternating current voltage) is represented by an absolute value of the maximum value of current (potential) in which the polarity is swung to be positive with respect to the reference potential, or an absolute value of the maximum value of current (potential) in which the polarity is swung to be negative.

In the embodiment, a voltmeter is used as the detector 35 of the light source device 1. The inter-electrode voltage of a pair of electrodes 610 and 710 of the discharge lamp 500 is detected by the detector 35, and the detected inter-electrode voltage is used for the driving control of the discharge lamp 500 to be described later. The inter-electrode voltage is a value corresponding to the inter-electrode distance. Accordingly, by detecting the inter-electrode voltage, the inter-electrode distance is indirectly acquired. As the inter-electrode voltage gets higher, the inter-electrode distance increases. In the embodiment, the inter-electrode voltage is measured by the voltmeter, and thus it is preferable to apply the invention when the frequency of the driving current (the driving voltage), that is, the first frequency of the first alternating current (the first alternating current voltage) is lower than 1 MHz.

In the light source device 1, the inter-electrode voltage of a pair of electrodes 610 and 710 is detected by the detector 35, and the detected inter-electrode voltage is transmitted to the control unit 33. As shown in FIG. 5, the control unit 33 switches the first alternating current supply section (the first period) 41 and the second alternating current supply section (the second period) 42 according to the detection result of the detector 35, that is, the detected inter-electrode voltage. That is, when the absolute value of the inter-electrode voltage is an allowable upper limit value (an example of the second value), the section is changed from the first alternating current supply section (the first period) 41 to the second alternating current supply section (the second period) 42, the frequency of the alternating current (the alternating current voltage) is lowered, and the second alternating current (the second alternating current voltage) formed by lowering the frequency with respect to the first alternating current (the first alternating current voltage) is supplied to a pair of electrodes 610 and 710. When the absolute value of the inter-electrode voltage is an allowable lower limit value (an example of the first value or the third value of the invention), the section is changed from the second alternating current supply section (the second period) 42 to the first alternating current supply section (the first period) 41, the frequency of the alternating current (the alternating current voltage) is raised, and the first alternating current (the first alternating current voltage) formed by raising the frequency with respect to the second alternating current (the second alternating current voltage) is supplied to a pair of electrodes 610 and 710.

Accordingly, it is possible to restrict the inter-electrode distance within a predetermined allowable range.

The allowable upper limit value and lower limit value of the absolute value of the inter-electrode voltage is not particularly limited, and is appropriately set according to terms and conditions, but the difference between the upper limit and the lower limit is preferably equal to or lower than 15 V, more preferably equal to or higher than 1 V and equal to or lower than 10 V, and even more preferably equal to or higher than 1 V and equal to or lower than 5 V. Accordingly, it is possible to keep the light quantity constant.

The allowable upper limit value of the absolute value of the inter-electrode value is preferably equal to or higher than 2 mV and equal to or lower than 500 V, and more preferably equal to or higher than 1 V and equal to or lower than 250 V.

The allowable lower limit value of the absolute value of the inter-electrode value is preferably equal to or higher than 1 mV and equal to or lower than 500 V, and more preferably equal to or higher than 1 V and equal to or lower than 250 V.

It is preferable to adjust the allowable upper limit value and lower limit value of the absolute value of the inter-electrode voltage according to the turning-on time of the discharge lamp 500. That is, as the turning-on time of the discharge lamp 500 increases, the protrusions 618 and 718 do not extend more easily. Accordingly, each of the allowable upper limit value and the lower limit value of the absolute value of the inter-electrode voltage is increased as much as the length of the turning-on time of the discharge lamp 500 is long. Accordingly, it is possible to suppress the inter-electrode distance from spreading more reliably.

Next, a control operation of the discharge lamp driving device 200 of the light source 1 will be described with reference to FIG. 6.

First, the first alternating current supply section (the first period) 41 is set, the first alternating current (the first alternating voltage) formed by raising the frequency with respect to the second alternating current (the second alternating current voltage) to a pair of electrodes 610 and 710, to turn on the discharge lamp 500 (Step S101). Accordingly, the protrusions 618 and 718 get smaller, and the inter-electrode voltage is gradually increased. As described above, the first alternating current (the first alternating current voltage) is gradually decreased such that the supplied power is constant. That is, in the first period when the inter-electrode voltage is raised from the lower limit value to the upper limit value, the driving voltage with the first frequency is applied to a pair of electrodes 610 and 710.

Then, the inter-electrode voltage is detected (Step S102), and it is determined whether or not the absolute value of the detected inter-electrode voltage has reached the allowable upper limit value (Step S103).

In Step S103, then the absolute value of the inter-electrode voltage is lower than the upper limit value, the process returns to Step S102, and Step S102 and the subsequent steps are performed again.

In Step S103, when the absolute value of the inter-electrode voltage reaches the upper limit value, the second alternating current supply section (the second period) 42 formed by lowering the frequency with respect to the first alternating current (the first alternating current voltage) is set, and the second alternating current (the second alternating current voltage) is supplied (applied) to a pair of electrodes 610 and 710 (Step S104). Accordingly, the protrusions 618 and 718 become larger, and the inter-electrode voltage is gradually lowered. As described above, the second alternating current (the second alternating current voltage) is gradually increased such that the supplied power is constant. That is, in the second period when the inter-electrode voltage is lowered from the upper limit value to the lower limit value, the driving voltage is applied between a pair of electrodes 610 and 710 at the second frequency.

Then, the inter-electrode voltage is detected (Step S105), and it is determined whether or not the absolute value of the detected inter-electrode voltage reaches the allowable lower limit value (Step S106).

In Step S106, when the absolute value of the inter-electrode voltage is larger than the lower limit value, the process returns to Step S105, and Step S105 and the subsequent steps are performed again.

In Step S106, when the absolute value of the inter-electrode voltage reaches the lower limit value, the process returns to Step S101, and the Step S101 and the subsequent steps are performed again. Accordingly, the absolute value of the inter-electrode voltage is kept in the allowable range, and the inter-electrode distance is kept in the allowable range.

As described above, according to the light source device 1, the blackening of the discharge lamp 500 is suppressed, and it is possible to achieve long durability. The protrusions 618 and 718 are formed on the electrodes 610 and 710, it is possible to suppress the inter-electrode distance from broadening, and it is possible to efficiently drive the discharge lamp 500.

The light source device and the method of driving the discharge lamp of the invention have been described above on the basis of the shown embodiment, but the invention is not limited thereto, and the configurations of the units may be replaced by arbitrary configurations having the same function. Other arbitrary configurations may be added to the invention.

Projector

Figure 7:
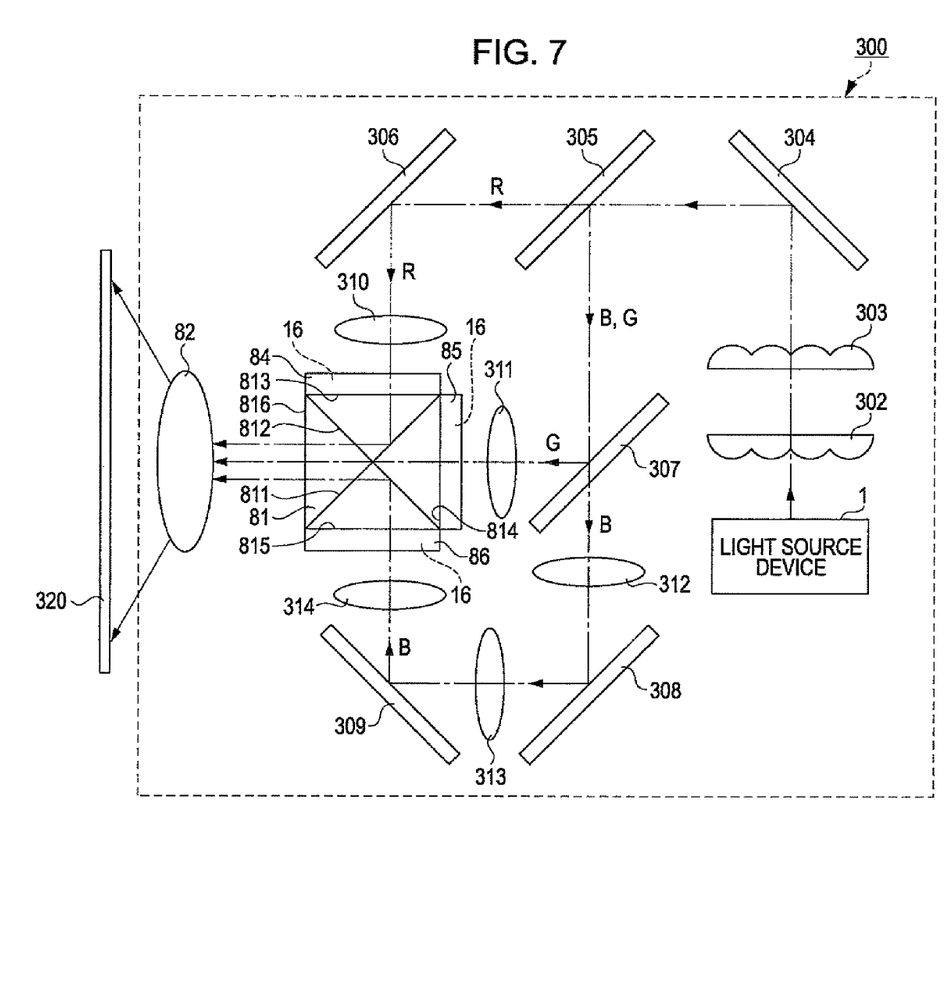
FIG. 7 is a schematic diagram illustrating a projector according to an embodiment of the invention.

FIG. 7 is a diagram schematically illustrating a projector according to the embodiment of the invention.

The projector 300 shown in FIG. 7 includes the light source device 1 described above, an illumination optical system that has integrator lenses 302 and 303, a color separation optical system (a light guide optical system), a liquid crystal light valve 84 corresponding to red (for red), a liquid crystal light valve 85 corresponding to green (for green), a liquid crystal light valve 86 corresponding to blue (for blue), a dichroic prism (a color synthesis optical system) 81 that is provided with a dichroic mirror face 811 reflecting only red light and a dichroic mirror face 812 reflecting only blue light, and a projection lens (a projection optical system) 82.

The color separation optical system includes mirrors 304, 306, and 309, a dichroic mirror 305 that reflects blue light and green light (allows only red light to pass), a dichroic mirror 307 that reflects only green light, a dichroic mirror 308 that reflects only blue light, and collective lenses 310, 311, 312, 313, and 314.

The liquid crystal light valve 85 includes a liquid crystal panel 16, a first polarization plate (not shown) bonded to an incidence face side of the liquid crystal panel 16, and a second polarization plate (not shown) bonded to an output face side of the liquid crystal panel 16. The liquid crystal light valves 84 and 86 have the same configuration as that of the liquid crystal light valve 85. Each of the liquid crystal panels 16 of the liquid crystal light values 84, 85, and 86 are connected to a driving circuit (not shown).

In the projector 300, a main portion of a modulation device that modulates the light output from the light source device 1 on the basis of image information is configured by the liquid crystal light valves 84, 85, and 86 and the driving circuits, and a main portion of a projection device that projects the light modulated by the modulation device is configured by the projection lens 82.

Next, an operation of the projector 300 will be described.

First, the white light (white light flux) output from the light source device 1 passes through the integrator lenses 302 and 303. The light quantity (brightness distribution) of the white light is made uniform by the integrator lenses 302 and 303.

The white light passing through the integrator lenses 302 and 303 is reflected by the mirror 304 to the left side in FIG. 7, the blue light (B) and the green light (G) of the reflection light are reflected to the lower side in FIG. 7 by the dichroic mirror 305, and the red light (R) passes through the dichroic mirror 305.

The red light passing through the dichroic mirror 305 is reflected to the lower side in FIG. 7 by the mirror 306, and the reflection light is shaped by the collective lens 310, and is input to the red liquid crystal light valve 84.

The green light between the blue light and the green light reflected by the dichroic mirror 305 is reflected to the left side in FIG. 7 by the dichroic mirror 307, and the blue light passes through the dichroic mirror 307.

The green light reflected by the dichroic mirror 307 is shaped by the collective lens 311, and is input to the green liquid crystal light valve 85.

The blue light passing through the dichroic mirror 307 is reflected to the left side in FIG. 7 by the dichroic mirror 308, and the reflected light is reflected to the upper side in FIG. 7 by the mirror 309. The blue light is shaped by the collective lenses 312, 313, and 314, and is input to the blue liquid crystal light valve 86.

As described above, the white light output from the light source device 1 is chromatically separated into three primary colors of red, green, and blue by the color separation optical system, and the light is led and input to the corresponding liquid crystal light values 84, 85, and 86.

In this case, pixels of the liquid crystal panel 16 of the liquid crystal light valve 84 are subjected to switching control (on/off) by a driving circuit operating on the basis of a red image signal, pixels of the liquid crystal panel 16 of the liquid crystal light valve 85 are subjected to switching control by a driving circuit operating on the basis of a green image signal, and pixels of the liquid crystal panel 16 of the liquid crystal light valve 86 are subjected to switching control (on/off) by a driving circuit operating on the basis of a blue image signal.

Accordingly, the red light, the green light, and the blue light are modulated by the liquid crystal light valves 84, 85, and 86, to form a red image, a green image, and a blue image respectively.

The red image formed by the liquid crystal light valve 84, that is, the red light from the liquid crystal light valve 84, is input from the incidence face 813 to the dichroic prism 81, is reflected to the left side in FIG. 7 by the dichroic mirror face 811, passes through the dichroic mirror face 812, and is output from the output face 816.

The green image formed by the liquid crystal light valve 85, that is, the green light from the liquid crystal light valve 85, is input from the incidence face 814 to the dichroic prism 81, passes through the dichroic mirror faces 811 and 812, and is output from the output face 816.

The blue image formed by the liquid crystal light valve 86, that is, the blue light from the liquid crystal light value 86, is input from the incidence face 815 to the dichroic prism 81, is reflected to the left side in FIG. 7 by the dichroic mirror face 812, passes through the dichroic mirror face 811, and is output from the output face 816.

As described above, the color light from the liquid crystal valves 84, 85, and 86, that is, the images formed by the liquid crystal light valves 84, 85, and 86 are synthesized by the dichroic prism 81, to form a color image. The image is projected (enlarged projection) onto a screen 320 provided at a predetermined position by the projection lens 82.

As described above, according to the projector 300, since the light source device 1 is provided, it is possible to reduce power consumption, and it is possible to display a stable and satisfactory image.

Next, specific examples of the invention and comparative examples will be described.

Example 1

As shown in FIG. 1, the light source device 1 with the following configuration in which the first alternating current supply section (the first period) 41 of supplying the first alternating current (the first alternating current voltage) to a pair of electrodes 610 and 710, and the second alternating current supply section (the second period) of supplying the second alternating current (the second alternating current voltage) to a pair of electrodes 610 and 710 are alternately repeated, was produced.
Constituent Material of Discharge Lamp Body 510: Quartz Glass
Enclosed Material in Discharge Lamp Body 510: Argon, Mercury, Methyl Bromine
Atmosphere at Turning-on in Discharge Lamp Body 510: 200 atm
Constituent Material of Electrodes 610 and 710: Tungsten
Inter-Electrode Distance: 1.1 mm
Rated Power: 200 W
First Frequency of First Alternating Current (First Alternating Current Voltage): 5 kHz
Duty Ratio (b1/a1) of First Alternating Current (First Alternating Current Voltage): 50%
Waveform of First Alternating Current (First Alternating Current Voltage): Rectangular
Second Frequency of Second Alternating Current (Second Alternating Current Voltage): 135 Hz
Duty Ratio (b2/a2) of Second Alternating Current (Second Alternating Current Voltage): 50%
Waveform of Second Alternating Current (Second Alternating Current Voltage): Rectangular
Average Value of Driving Current (Driving Voltage): 2.9 A
Lower Limit Value of Absolute Value of Inter-Electrode Voltage: 66.5 V
Upper Limit Value of Absolute Value of Inter-Electrode Voltage: 71.5 V Comparative Example 1

In Comparative Example 1, the same light source device as Example 1 was produced except that the alternating current (the alternating current voltage) used as the driving current (the driving voltage) has a frequency of 135 Hz (although it was 150 Hz in J0163667JP01), a duty ratio of 50%, and the rectangular waveform.

Comparative Example 2

In Comparative Example 2, the same light source device as Example 1 was produced except that the alternating current (the alternating current voltage) used as the driving current (the driving voltage) has a frequency of 5 kHz, a duty ratio of 50%, and the rectangular waveform.

Comparative Example 3

In Comparative Example 3, on the contrary to Example 1, when the absolute value of the inter-electrode voltage is the lower limit value, the frequency is lowered, the section is the second alternating current supply section of supplying the second alternating current (the second alternating current voltage) to a pair of electrodes, and when the absolute value of the inter-electrode voltage is the upper limit value, the frequency is raised, the section is the first alternating current supply section of supplying the first alternating current (the first alternating current voltage) to a pair of electrodes. The same light source device as that of Example 1 was produced except that the condition is changed as follows.

The frequency of the first alternating current (the first alternating current voltage) in the first alternating current supply section is set in the condition in which the protrusions grow and the inter-electrode distance is decreased, and the frequency of the second alternating current (the second alternating current voltage) in the second alternating current supply section is set in the condition in which the protrusions are melted and the inter-electrode distance is increased.
Frequency of First Alternating Current (First Alternating Current Voltage): 135 kHz
Frequency of Second Alternating Current (Second Alternating Current Voltage): 50 Hz
Assessment As for Example 1 and Comparative Examples 1 to 3, assessments were performed as follows. The result is as shown in Table.

In the assessment of (protrusion (inter-electrode distance)), the discharge lamp was turned on, the change in the inter-electrode distance of a pair of electrodes was observed for 500 hours from the start of the turning-on.

In the assessment standard, as for the inter-electrode distance at the time of starting the turning-on, a case of no change in the inter-electrode distance was marked as "○", a case of the change of the inter-electrode distance within 10% was marked as "Δ", and a case of the change of the inter-electrode distance over 10% was marked as "x".

In the assessment of (blackening resistance), the discharge lamp was turned on, the power was turned off after 500 hours from the start of the turning-on, and a red heat state was observed.

In the assessment standard, a case where no red heat was marked as "○", and a case where red heat was marked as "x".

TABLE

|  | Protrusion | Blackening |
| --- | --- | --- |
| Example 1 | ○ | ○ |
| Comparative Example 1 | Δ | x |
| Comparative Example 2 | x | ○ |
| Comparative Example 3 | ○ | x |

As clarified from Table, in Example 1, the protrusions 618 and 718 were reliably formed at the front end portions of the electrodes 610 and 710, there was no change in the inter-electrode distance, the blackening did not occur, and it was possible to obtain a satisfactory result.

Meanwhile, in Comparative Examples 1 to 3, it was difficult to obtain a satisfactory result.

The entire disclosure of Japanese Patent Application No. 2011-180328, filed Aug. 22, 2011 and 2012-140545, filed Jun. 22, 2012 are expressly incorporated by reference herein.

What is claimed is:

1. A light source device comprising:
    a discharge lamp that has a first electrode and a second electrode;
    a driving device that supplies a driving current to the first electrode and the second electrode; and
    a voltage detecting unit that detects an inter-electrode voltage between the first electrode and the second electrode,
    wherein if the inter-electrode voltage decreases to a first value, the driving device supplies a first driving current having a first frequency to the discharge lamp,
    wherein if the inter-electrode voltage increases to a second value larger than the first value, the driving device supplies a second driving, current having a second frequency to the discharge lamp,
    wherein the first frequency is higher than 1 kHz, and
    wherein the second frequency is equal to or lower than 1 kHz.

2. The light source device according to claim 1, wherein in a period in which the first current is supplied, the driving device decreases the driving current to the first driving current.

3. The light source device according to claim 1, wherein in a period in which the second current is supplied, the driving device increases the driving current to the second driving current.

4. The light source device according to claim 1, wherein the driving device alternately repeats a period in which the first driving current is supplied and a period in which the second driving current is supplied.

5. A method of driving a discharge lamp which has a first electrode and a second electrode, the method comprising:
    detecting an inter-electrode voltage between the first electrode and the second electrode;
    supplying a first driving current having a first frequency to the discharge lamp if the inter-electrode voltage decreases to a first value; and
    supplying a second driving current having a second frequency to the discharge lamp if the inter-electrode voltage increases to a second value larger than the first value,
    wherein the first frequency is higher than 1 kHz, and
    wherein the second frequency is equal to or lower than 1 kHz.

6. A projector comprising:
    the light source device according to claim 1;
    a modulation device that modulates light output from the light source device on the basis of image information; and
    a projection device that projects the light modulated by the modulation device.

* * * * *